(12) United States Patent  (10) Patent No.: US 8,004,417 B2
Halpin  (45) Date of Patent: Aug. 23, 2011

(54) COMPUTER DEVICE OUTPUT SETTING INDICATOR

(75) Inventor: Peter J. Halpin, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 685 days.

(21) Appl. No.: 11/261,868

(22) Filed: Oct. 28, 2005

(65) Prior Publication Data

US 2007/0130398 A1  Jun. 7, 2007

(51) Int. Cl.
*G08B 21/00* (2006.01)
*G06F 3/033* (2006.01)
*G06F 3/00* (2006.01)
*G06F 13/00* (2006.01)
*G06F 13/12* (2006.01)

(52) U.S. Cl. ............ 340/635; 340/686.1; 345/184; 710/15; 710/33; 710/300; 710/62; 711/100

(58) Field of Classification Search .......... 340/635; 710/62, 300; 711/100
See application file for complete search history.

(56) References Cited

U.S. PATENT DOCUMENTS

| 5,185,679 | A | * | 2/1993 | Mishima et al. | 360/30 |
| 5,754,798 | A |   | 5/1998 | Uehara et al. | |
| 6,252,511 | B1 |   | 6/2001 | Mondshine et al. | |
| 6,819,961 | B2 |   | 11/2004 | Jacobs et al. | |
| 6,832,271 | B1 | * | 12/2004 | Ivan et al. | 710/15 |
| 2002/0171999 | A1 | * | 11/2002 | Huang | 361/600 |
| 2003/0090517 | A1 | * | 5/2003 | Anderson et al. | 345/747 |
| 2003/0174161 | A1 | * | 9/2003 | Wilburn et al. | 345/730 |
| 2004/0015629 | A1 | * | 1/2004 | Inui et al. | 710/300 |
| 2004/0101144 | A1 | * | 5/2004 | Lee | 381/58 |
| 2004/0222977 | A1 | * | 11/2004 | Bear et al. | 345/184 |
| 2005/0182867 | A1 | * | 8/2005 | Reynolds | 710/33 |
| 2006/0044148 | A1 | * | 3/2006 | Daniels et al. | 340/686.1 |
| 2006/0155914 | A1 | * | 7/2006 | Jobs et al. | 711/100 |
| 2006/0165110 | A1 | * | 7/2006 | Magendanz et al. | 370/419 |
| 2007/0079030 | A1 | * | 4/2007 | Okuley et al. | 710/62 |
| 2007/0290790 | A1 | * | 12/2007 | Miller et al. | 340/5.22 |

* cited by examiner

*Primary Examiner* — George A Bugg
*Assistant Examiner* — Jack Wang

(57) ABSTRACT

A computer device comprises an output monitor configured to determine an output configuration setting for the computer device and automatically actuate an output setting indicator corresponding to the output configuration setting.

23 Claims, 3 Drawing Sheets

COMPUTER DEVICE OUTPUT SETTING INDICATOR

BACKGROUND OF THE INVENTION

Computer devices, such as desktop computers or notebook computers, comprise connector ports to enable attachment of external devices to the computer (e.g., projectors, monitors, disk drives, etc.) For example, to display a presentation running on the computer to a wide audience, an external projector is couplable to the computer through a connector port of the computer. However, delays in booting of the external device, delays in data transfer to the external device and/or other reasons may give a user the impression that there is a problem, either with the computer or the external device. In response, the user oftentimes cycles through numerous output settings of the presentation application (e.g., an internal setting where output is displayed only on the screen of the computer, an external setting where the output is displayed only on the projector and/or a hybrid setting where the output is displayed on both the computer and the projector) in an attempt to resolve the issue, which is time consuming and frustrating to the user.

BRIEF DESCRIPTION OF THE DRAWINGS

For a more complete understanding of the present invention, and the objects and advantages thereof, reference is now made to the following descriptions taken in connection with the accompanying drawings in which.

DETAILED DESCRIPTION OF THE DRAWINGS

Figure 1:
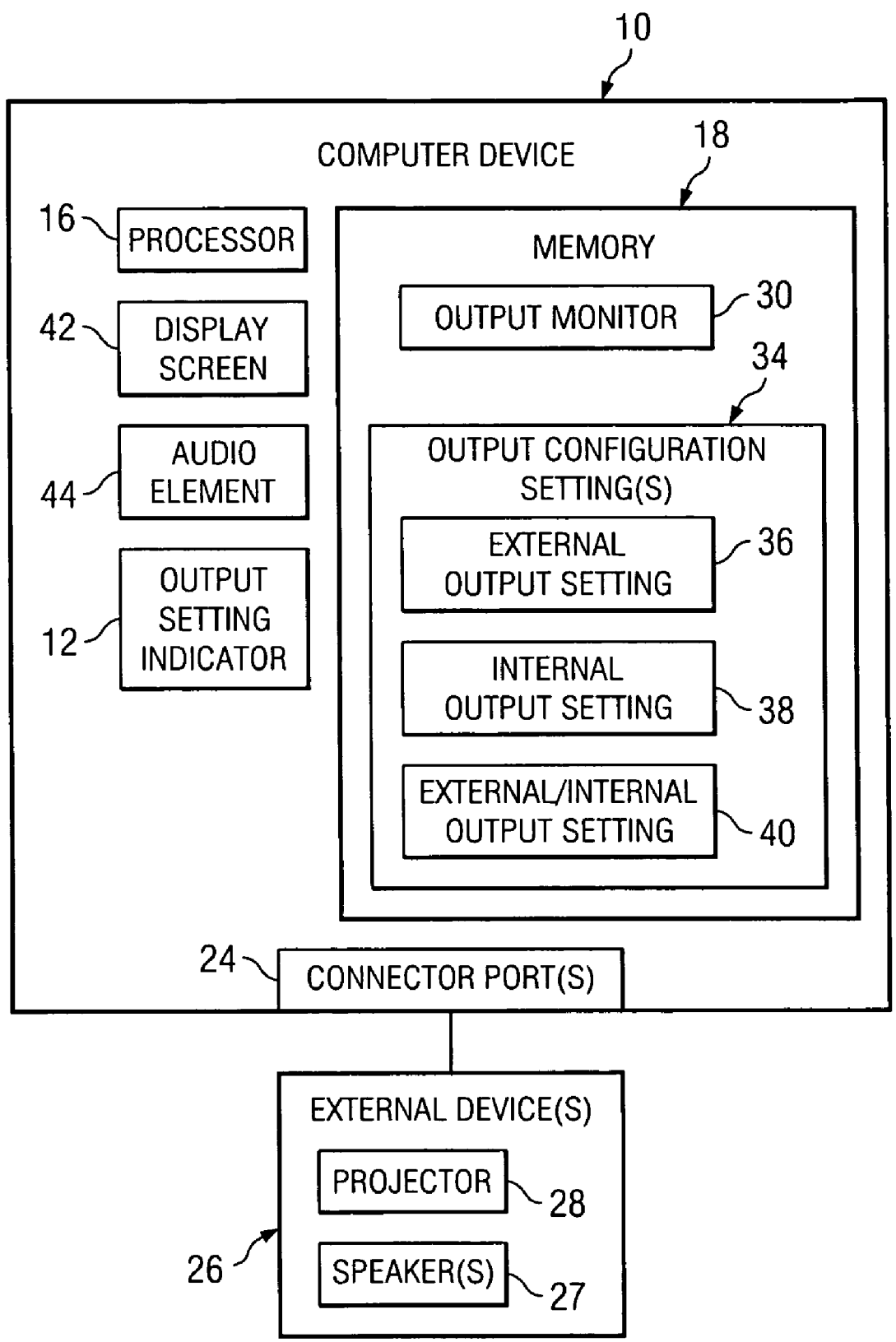
FIG. 1 is a block diagram illustrating an embodiment of a computer device having an output setting indicator in accordance with the present invention.
Figure 2:
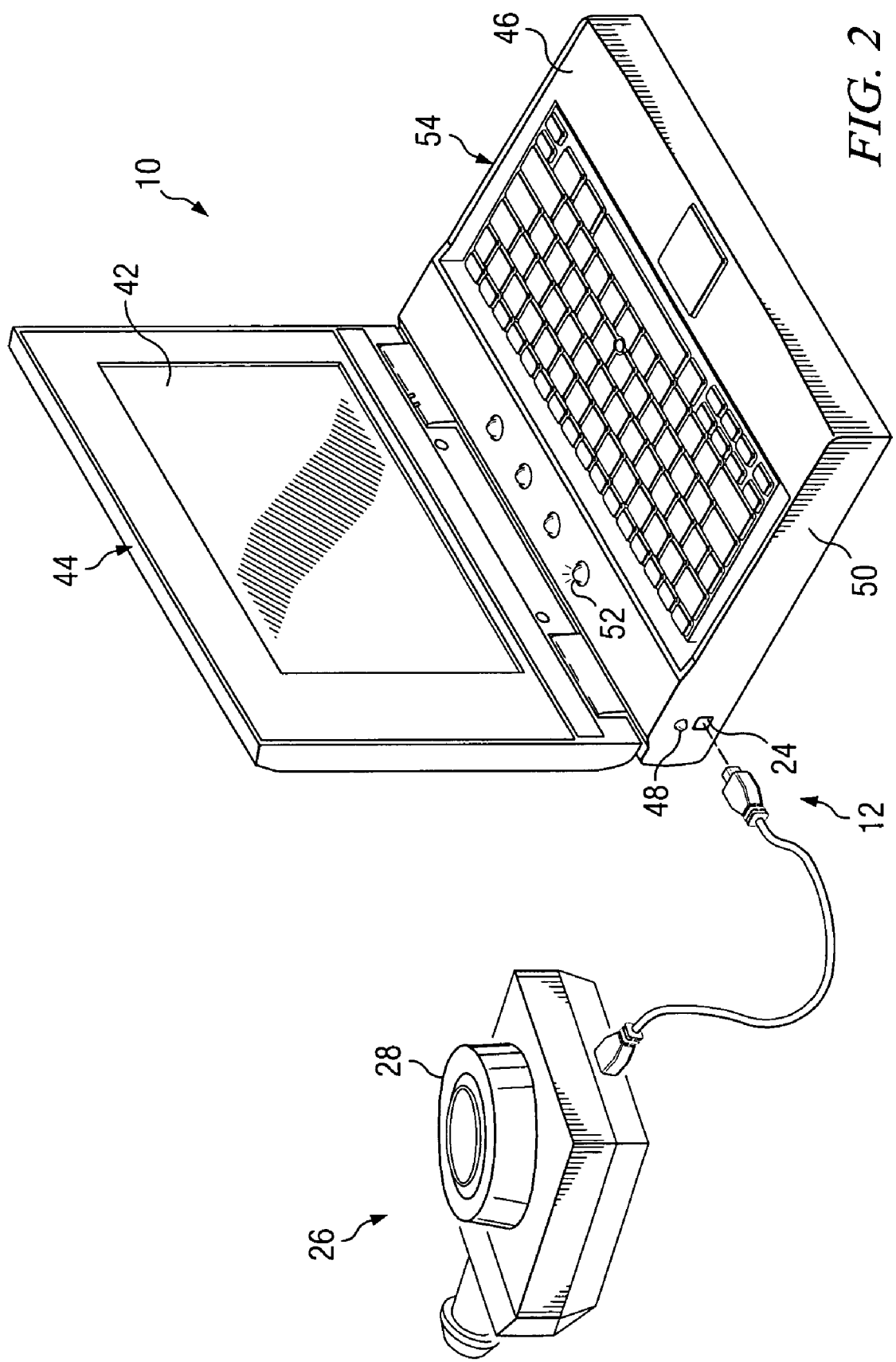
FIG. 2 is a diagram illustrating an embodiment of the computer device of FIG. 1 having an output setting indicator in accordance with the present invention.
Figure 3:
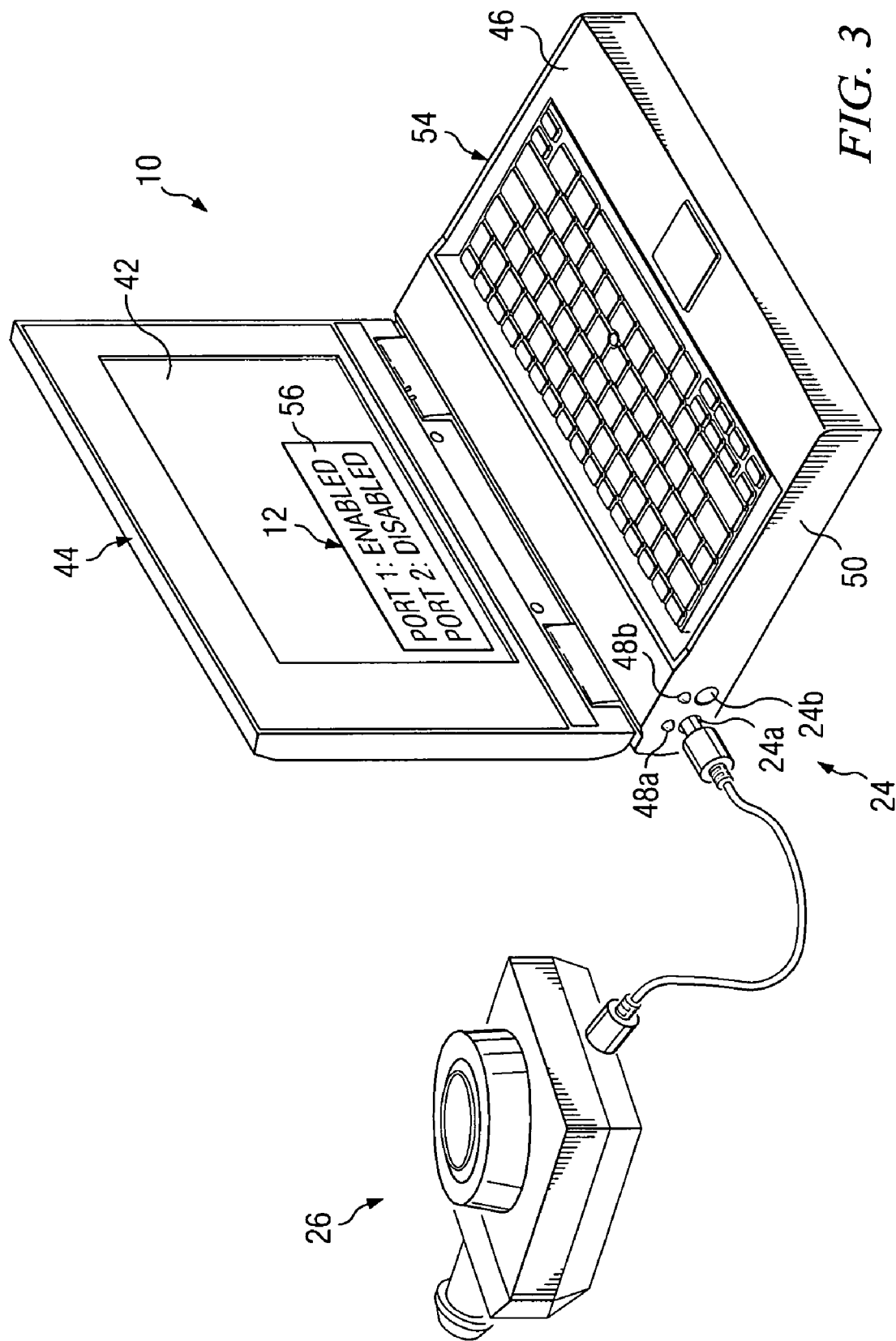
FIG. 3 is a diagram illustrating another embodiment of the computer device of FIG. 1 having an output setting indicator in accordance with the present invention.

The preferred embodiments of the present invention and the advantages thereof are best understood by referring to FIGS. 1-3 of the drawings, like numerals being used for like and corresponding parts of the various drawings.

FIG. 1 is a diagram illustrating an embodiment of a computer device 10 comprising an output setting indicator 12 in accordance with the present invention. Computer device 10 may comprise any type of computer device such as, but not limited to, a desktop personal computer, tablet personal computer, laptop or notebook computer, a handheld computing device, or any other type of portable or non-portable computer device.

In the embodiment illustrated in FIG. 1, computer device 10 further comprises a processor 16 coupled to a memory 18, connector port(s) 24, a display screen 42 and an audio element 44. In the embodiment illustrated in FIG. 1, connector port(s) 24 are communicatively coupled to external device(s) 26. In the illustrated embodiment, external device(s) 26 comprise a projector 28 for visually displaying output from computer device 10 and attachable speaker(s) 27 for providing audio output from computer device 10. However, it should be understood that external device(s) 26 may comprise any other type of device capable of receiving an output from computer device 10 and/or inputting information to computer device 10, such as, but not limited to, a monitor, printer, disk drive, modem, scanner or keyboard. Display screen 42 may comprise any type of display element for displaying visual content to a user such as, but not limited to, a liquid crystal display (LCD). Audio element 44 comprises any type of audio component of computer device 10 for providing an audio output such as, but not limited to, a speaker. It should be understood that computer device 10 may be manufactured having other and/or additional components.

In the embodiment illustrated in FIG. 1, computer device 10 comprises an output monitor 30. Output monitor 30 may comprise software, hardware, or a combination of software and hardware. In FIG. 1, output monitor 30 is illustrated as being stored in memory 18 so as to be accessible and executable by processor 16. However, it should be understood that output monitor 30 may be otherwise located or stored. In the embodiment illustrated in FIG. 1, computer device 10 comprises output configuration setting(s) 34. Output configuration setting(s) 34 comprise information and/or setting(s) for controlling an output of content by device 10 (e.g., audio and/or visual content). In the embodiment illustrated in FIG. 1, output configuration setting(s) 34 comprise an external output setting 36 (e.g., outputting content of application 32 only to external device(s) 26), an internal output setting 38 (e.g., outputting content of application 32 only to internal devices of computer device 10 (e.g., devices contained on and/or otherwise forming a part of computer device 10) such as display screen 42 and/or audio element 44) and an external/internal output setting 40 (e.g., outputting content of application 32 to both external device(s) 26 and internal device(s) of computer device 10, such as display screen 42 and/or audio element 44). However, it should be understood that other output setting(s) 34 may be configured (e.g., for different types of applications, different types of data content and/or different types of external devices 26).

Output monitor 30 detects and/or otherwise determines a particular output configuration setting 34 selected and/or otherwise configured, either by a user or as a default selection, for presenting and/or otherwise outputting content by computer device 10. Based on the particular output configuration setting 34 of device 10, output monitor 30 actuates output setting indicator 12 corresponding to the selected output configuration setting 34. In some embodiments of the present invention, output monitor 30 is configured to actuate output setting indicator 12 for a particular type of configuration setting 34. For example, in some embodiments of the present invention, output monitor 30 is configured to actuate a particular output setting indicator 12 only for configuration settings 34 transmitting output to external device(s) 26. Thus, in the above example, if external output setting 36 or external/internal output setting 40 is selected and/or enabled, output monitor 30 actuates output setting indicator 12, thereby indicating to a user that content will be output by computer device 10 at least through connector port 24 to external device(s) 26. In other embodiments of the present invention, output monitor 30 is configured to actuate a particular output setting indicator 12 for each available configuration setting 34 (e.g., a particular indicator 12 for external output setting 36, another indicator 12 for internal output setting 38, etc.) In some embodiments of the present invention, output setting indicator 12 is used to visually indicate the particular output configuration setting 34. However, it should be understood that output setting indicator 12 may comprise other types of devices or elements for providing different types of indications (e.g., audio, a combination of audio and visual, etc.).

FIG. 2 is a diagram illustrating an embodiment of computer device 10 with output setting indicator 12 in accordance with the present invention. In the embodiment illustrated in FIG. 2, computer device 10 comprises a laptop or notebook computer having a display member 44 rotatably coupled to a base member 46. In the embodiment illustrated in FIG. 2, output setting indicator 12 comprises a light source 48 (e.g., a light emitting diode (LED)) disposed adjacent to connector port 24 on a side surface 50 of base member 46 to visually indicate selection a particular output configuration setting 34. Preferably, light source 48 is located near a particular connector port 24 that is enabled and/or otherwise configured to be used for content output based on the particular output configuration setting 34, thereby visually indicating to the user the particular connector port 24 enabled for the content output (e.g., by illuminating light source 48). However, it should be understood that light source 48 may be otherwise located (e.g., any location on base member 46 or display member 44). Further, it should be understood that output setting indicator 12 may comprise other types of indicators configured to visually indicate a particular output configuration setting 34 and/or connect port 24 enabled. It should be understood that non-illumination of light source 48 may also be used as an indication of either an enabled or non-enabled status of a particular connector port 24.

Thus, in the embodiment illustrated in FIG. 2, for example, if output configuration settings 34 are selected that will use and/or otherwise enable connector port 24 for content output, output monitor 30 causes illumination of light source 48, thereby visually indicating to a user that data content will be output through the particular connector port 24 associated with light source 48. Thus, for example, if either external output setting 36 or external/internal output setting 40 is selected, output monitor 30 causes illumination of light source 48.

Embodiments of the present invention may also be configured to utilize a variety of methods of output setting indicator 12 actuation. For example, in some embodiments of the present invention, light source 48 is configured to blink to indicate an enabled status of connector port 24 for output of content for a particular configuration setting 34. In other embodiments of the present invention, output setting indicator 12 comprises a multi-color light source 48 to indicate an enabled status of connector port 24 for outputting content (e.g., a green light indicating connector port 24 is enabled based on a particular configuration setting 34 and a red light indicating that connector port 24 is not enabled for a particular configuration setting 34). Thus, in the above example, light source 48 would be illuminated green for output settings 36 and 40 and illuminated red for setting 38.

In other embodiments of the present invention, output setting indicator 12 is configured for operation as part of, or in combination with, a multi-purpose light source 52 (e.g., an LED). For example, multi-purpose light source 52 may be used for other purposes such as, but not limited to, indicating whether computer device 10 is powered on or powered off. Thus, in this embodiment of the present invention, light source 52 may be configured to blink to indicate an enabled status of a particular connector port 24 for a particular configuration setting 34, be configured as a multi-color light source 52 having a particular color for indicating an enabled status of connector port 24 for different configuration settings 34, or otherwise. In the embodiment illustrated in FIG. 2, multi-purpose light source 52 is disposed on a working surface 54 of base member 46. However, it should be understood that multi-purpose light source 52 may be otherwise located on computer device 10 (e.g., any location on base member 46 and/or display member 44).

In yet other embodiments of the present invention, output setting indicator 12 is configured to display an indication of each selectable output configuration setting 34. For example, in some embodiments of the present invention, output setting indicator 12 comprises a plurality of light sources 48 each corresponding to a different output configuration setting 34 (e.g., one light source 48 for external output setting 36, another light source 48 for display screen output setting 38, and yet another light source 48 for display screen/external output setting 40). In other embodiments of the present invention, a multi-color light source 48 may be used such that a different color is illuminated for each different configuration setting 34.

FIG. 3 is a diagram illustrating another embodiment of computer device 10 having output setting indicator 12 in accordance with the present invention. In the embodiment illustrated in FIG. 3, output setting indicator 12 comprises a display element 56 displayable on display screen 42 of computer device 10 to indicate a particular selected output configuration setting 34. Display element 56 may comprise a pop-up window, icon or other type of graphical indicator presented on display screen 42 of computer device 10 to indicate the selected output configuration setting 34. For example, in some embodiments of the present invention, display element 56 is used to visually indicate to a user selection of one of settings 36, 38 or 40 (e.g., a textual display or otherwise). In other embodiments of the present invention, display element 56 is used to visually indicate an enabled status of a particular connector port 24 that will be used to output content for a particular configuration setting 34. For example, in the embodiment illustrated in FIG. 3, computer device 10 comprises two connector ports 24*a* and 24*b*. In some embodiments of the present invention, output monitor 30 uses display element 56 to display to the user that particular connector port 24*a* and/or 24*b* enabled for content output for a particular configuration setting 34.

In other embodiments of the present invention, computer device comprises an output setting indicator 12 associated with each or particular connector ports 24. For example, in the embodiment illustrated in FIG. 3, output setting indicator 12 comprises light sources 48*a* and 48*b* located near and/or otherwise associated with respective connector ports 24*a* and 24*b*. In operation, output monitor 30 (FIG. 1) causes illumination of a particular light source 48*a* and/or 48*b* as being enabled for content output based on a particular configuration setting 34. For example, if a particular configuration setting 34 is set to use connector port 24*a* for output of content, output monitor 30 causes illumination of light source 48*a* associated therewith, thereby providing a user with a visual indication of the particular connector port 24 enabled for content output for a particular output configuration setting 34. Thus, embodiments of the present invention provide an indication enabling a user to easily identify that a particular connector port 24 is enabled for content output for a particular output configuration setting 34.

Thus, embodiments of the present invention provide an output setting indicator 12 to provide a user with an indication that a particular connector port 24 is enabled and/or otherwise selected as an output port for a particular configuration setting 34. Thus, embodiments of the present invention enable a user to easily identify a particular connector port 24 to connect an external device 26 thereto for obtaining an output of content on such external device 26. Embodiments of the present invention also provide a user with an indication that a particular connector port 24 is enabled and/or otherwise selected as an output port for a particular configuration setting 34 to enable the user to easily change the configuration setting 34 and obtain a confirmation that the connector port 24 to which a particular external device 26 is connected has been enabled for content output (e.g., by a visually illuminated element or otherwise).

What is claimed is:

1. A notebook computer, comprising:
   a connector port located on a surface of a base of the notebook computer;
   an output setting indicator located on the surface of the base and adjacent the connector port; and
   an output monitor that determines an output configuration setting for the notebook computer and automatically actuates the output setting indicator corresponding to the output configuration setting, wherein the output setting indicator indicates to a user when the connector port is enabled for communicating data with an external device through the connector port and when the connector port is not enabled for communicating data with the external device through the connector port.

2. The notebook computer of claim 1, wherein the output setting indicator illuminates a first color to indicate that the connector port is enabled for communicating the data and illuminates a second color to indicate that the connector port is not enabled for communicating the data.

3. The notebook computer of claim 1, wherein the output setting indicator comprises a light source.

4. The notebook computer of claim 1, wherein the output setting indicator comprises a display element displayed on a display screen of the notebook computer.

5. The notebook computer of claim 1, wherein the output setting indicator comprises a multi-purpose light source that illuminates green when the connector port is enabled for communicating the data and illuminates red when the connector port is not enabled for communicating the data.

6. The notebook computer of claim 1, wherein the output setting indicator comprises a multi-color light source.

7. The notebook computer of claim 1, wherein the output setting indicator comprises a plurality of light sources each associated with one of a plurality of connector ports of the notebook computer.

8. The notebook computer of claim 1, wherein the output setting indicator comprises a plurality of light sources each associated with one of a plurality of output configuration settings.

9. A personal computer comprising:
   a port on a base of the personal computer;
   a light adjacent the port on the base; and
   means for determining an output configuration setting of the computer device and automatically actuating the light corresponding to the output configuration setting, wherein the light indicates to a user when the port is enabled for communicating data with an external device through the port and when the port is not enabled for communicating data with the external device through the port.

10. The personal computer of claim 9, wherein the light is multi-colored and displays different colors to indicate different configuration settings for the port.

11. The personal computer of claim 9, wherein the light illuminates to indicate that data will be output through the port.

12. The personal computer of claim 9, wherein the light blinks to indicate an enabled status of the port.

13. The personal computer of claim 9, wherein the light illuminates red to indicate that the port is not enabled and illuminates green to indicate that the port is enabled.

14. A method of manufacturing a notebook computer, comprising:
   providing a port on a surface of the notebook computer;
   providing an output setting indicator on the surface and next to the port; and
   providing an output monitor that determines an output configuration setting of the notebook computer and automatically actuates the output setting indicator corresponding to the output configuration setting, wherein the output setting indicator indicates when the port is enabled for communicating data with an external device through the port and when the port is not enabled for communicating data with the external device through the port.

15. The method of claim 14, wherein the output setting indicator is a light emitting diode (LED).

16. The method of claim 14, further comprising providing a multi-use light source as the output setting indicator.

17. The method of claim 14, further comprising providing a multi-color light source as the output setting indicator.

18. The method of claim 14, further comprising disposing the output setting indicator adjacent to the port on a base of the notebook computer.

19. The method of claim 14, further comprising illuminating the output setting indicator when the port is enabled.

20. The method of claim 14, further comprising configuring the output setting indicator to indicate an enabled status of the port of the notebook computer.

21. A personal computer, comprising:
   at least one connector port on a base of the personal computer; and
   at least one light on the base and adjacent the at least one connector port and actuatable to indicate an enabled status of the at least one connector port of the personal computer based on an output configuration setting of the personal computer device, wherein the light indicates to a user when the at least one connector port is enabled for communicating data with an external device through the at least one connector port and when the at least one connector port is not enabled for communicating data with the external device through the at least one connector port.

22. The personal computer of claim 21, wherein the light turns green when the connector port is enabled to transmit data and turns red when the connector port is not enabled to transmit data.

23. The personal computer of claim 21, wherein the light comprises a multi-color light source.

* * * * *